United States Patent [19]

Pennebaker

[11] Patent Number: 4,656,665
[45] Date of Patent: Apr. 7, 1987

[54] THRESHOLDING TECHNIQUE FOR GRAPHICS IMAGES USING HISTOGRAM ANALYSIS

[75] Inventor: William B. Pennebaker, Carmel, N.Y.

[73] Assignee: International Business Machines Corporation, Armonk, N.Y.

[21] Appl. No.: 692,008

[22] Filed: Jan. 15, 1985

[51] Int. Cl.$^4$ .............................................. G06K 9/39
[52] U.S. Cl. ...................................... 382/51; 382/18; 358/163; 358/280
[58] Field of Search ..................... 382/18, 51; 358/282, 358/280, 80, 163

[56] References Cited

U.S. PATENT DOCUMENTS 4,326,258  4/1982  de la Guardia .................. 382/52
4,538,227  8/1985  Toraichi et al. .................. 364/414

OTHER PUBLICATIONS

D. Ting et al., *Proc. of the IEEE*, vol. 68, No. 7, 7/80 "Digital Processing Techniques for Encoding of Graphic", in Science Library.

Anostassiou et al., *European patent application*, Pub. No. 0 113 016, 7/11/84.

Primary Examiner—Leo H. Boudreau
Assistant Examiner—Jose L. Couso
Attorney, Agent, or Firm—Thomas P. Dowd; Terry J. Ilardi

[57] ABSTRACT

A system is described for thresholding graphics images to reduce the information content for transmission and reproduction and which uses a particular image data thresholding technique that may be used to obtain display images with a number of intensity levels. Firstly, an histogram of the image to be encoded is generated and analyzed to determine essential parameters. In particular, the background color of the image is determined by summing the histogram elements to find the median of the distribution, that is, the point at which the half sum of total pixels is reached. The extrema of the histogram are calculated and the skew is determined from the position of the median with respect thereto. If the difference between the median and the black extreme is less than half the difference between the median and the white extreme then the background of the image is deemed to be black, otherwise, the image will be defined as having a white background. After the background color is determined, the width of the background region, that is, the difference between the median and the foreground color extreme, is used to define the edge between the background and foreground regions, which edge occurs at one-half the background width from the median in the direction of the background color extreme. A sequence of threshold levels may then be determined using this edge as a base, by setting them at points disposed at fractionally different distances between the edge and the background color extreme.

10 Claims, 3 Drawing Figures

THRESHOLDING TECHNIQUE FOR GRAPHICS IMAGES USING HISTOGRAM ANALYSIS

DESCRIPTION

BACKGROUND OF THE INVENTION

The present invention relates to digital processing techniques for graphics and, more particularly, to a method and means for thresholding image data to reduce the information content for transmission and reproduction.

The general concept of thresholding in connection with image data handling to reduce the information content of an image to essentially black and white form is well known. The many related prior art techniques primarily deal with how the thresholding decisions are made and typical approaches are variously taught, for example, in U.S. Pat. No. 4,251,837 to JANEWAY, IBM Technical Disclosure Bulletin, Vol. 14, No. 4, September 1971, CHOW ET AL, pages 1301-1304, as well as in U.S. Pat. Nos. 4,439,789 to CAHILL, 4,238,768 to MITSUYA ET AL, and 4,326,258 to de la GUARDIA.

The essential problem in thresholding is to identify (1) the intensity range in an image which is to be considered background, (2) the intensity range which is to be considered foreground, that is, the text areas, and (3) the color of the background, that is, whether black or white. Any thresholding technique is preferably simple from a computational point and yet reliable. A convenient method of analyzing intensity ranges in this manner is with the use of an image histogram, that is, a plot of the intensity distribution of the image. One prior art example of thresholding with a histogram is found in the cited IBM Technical Disclosure Bulletin of CHOW ET AL wherein thresholds are calculated by computing the histogram for each region of an image and then determining the thresholds from the estimated distribution by the method of maximum likelihood. The de la GUARDIA patent also discusses the setting of thresholds using the histogram of FIG. 8. Both of these systems, however, have a fair degree of complexity. Other techniques involve histogram peak location and while perhaps less complex frequently lack reliability.

By comparison the present invention discloses a system that is both simple and reliable using only very easily obtained histogram parameters and which, when combined with shading correction techniques, such as disclosed in co-pending U.S. patent application field concurrently herewith, U.S. application Ser. No. 778,632 filed Sept. 20, 1985, is very robust.

SUMMARY OF THE INVENTION

The present invention involves a method and apparatus for thresholding image data by determining three threshold levels in the image histogram that are used for producing four intensity levels of the image. Firstly, an histogram of the image is generated and the median of the distribution is calculated by summing the histogram elements until the half sum is reached. The extrema are calculated by summing from each end of the intensity range until respective small but significant numbers are found, and then scanning back toward the respective intensity range ends until zero elements are found in the histogram. To determine the color of the background the skew of the histogram is then determined from the position of the median relative to the extrema. Unless the document background can be clearly classified as black, that is, the difference between the median and the black extreme is less than half the difference between the white extreme and the median, then the image is defined to have a white background. A measure of the width of the background region is then determined from the difference between the median and the extreme for the background color, and the edge between the background and foreground regions is defined as being at a distance of one half the background width measured from the median toward the foreground color extreme. This convenient edge determination is then used as a base for calculating the sequence of threshold levels which are set as fractions of the difference between the edge and the foreground extreme. A nonlinear scale is preferably used, the three levels being determined at ⅛, ¼ and ½ the distance between the edge and the foreground extreme, or at 3/16, ⅜ and ¾, which differences define the threshold levels for a white background image as between white/gray-white, gray-white/gray-black, and gray-black/black. This technique is particularly suitable for use in a teleconferencing system for thresholding of images to a two-bit/pixel form such as described in U.S. Pat. No. 4,532,651 issued July 30, 1985 and U.S. Pat. No. 4,558,370 issued Dec. 10, 1985, assigned to the same assignee at the present application.

DETAILED DESCRIPTION OF THE PREFERRED EMBODIMENT

The present invention deals with graphics images and is particularly useful in systems wherein images are scanned and digitally encoded and after transmission and processing are reproduced in one form or another as in teleconferencing systems or fascimile machines. It is usually necessary in such systems to reduce the information content of the image to facilitate processing and then to reproduce the image in a useable form. As noted above, a technique for accomplishing this end is the use of thresholding wherein preselected intensity levels are established for handling the digitized data. The basic thresholding procedure involves identifying the intensity ranges to be considered background and foreground and determining the color of the background. The color of the background will be determined to be black or white and the foreground, either whiter or blacker, respectively, will be the region containing the text material or other image detail.

Figure 1:
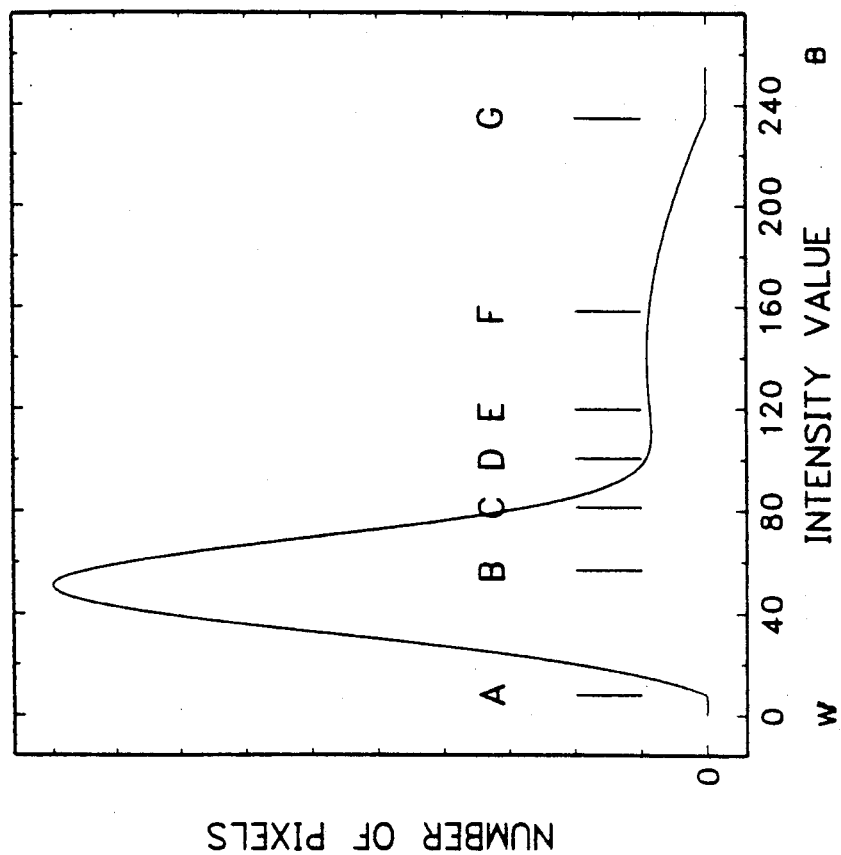
FIG. 1 is an illustration of a typical histogram of a graphics image that may be analyzed in accordance with the present invention.
Figure 2:
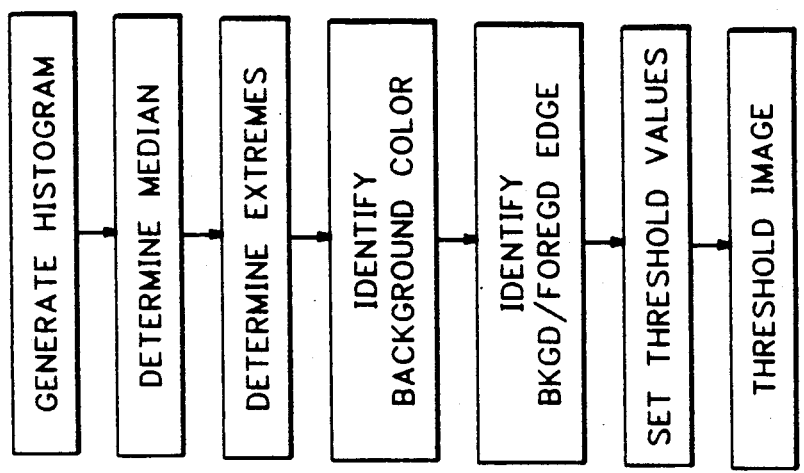
FIG. 2 is a flow chart of an embodiment of the present invention.

In accordance with the invention, the first step in the process is to generate a histogram of the graphics image such as, for example, a histogram of the type shown in FIG. 1. This histogram illustrates the distribution or the number of pixels at each intensity, along the vertical axis, as compared to their intensity values along the horizontal axis. As will be familiar to those skilled in the art the broad peak in the histogram is caused by the white background of the image and the darker text causes the tail to the right. For the purpose of the analysis, point G represents the black extreme and point A represents the white extreme of the image while the median is indicated by the point B. The edge between the background and the foreground regions is indicated by C. By way of illustration it is desired to define three threshold levels which will permit thresholding of the image to four intensity levels. The three threshold levels may be indicated by the points D, E, and F. The method of the invention for calculating the location of the three points involves the following steps shown in the flow chart in FIG. 2.

Figure 3:
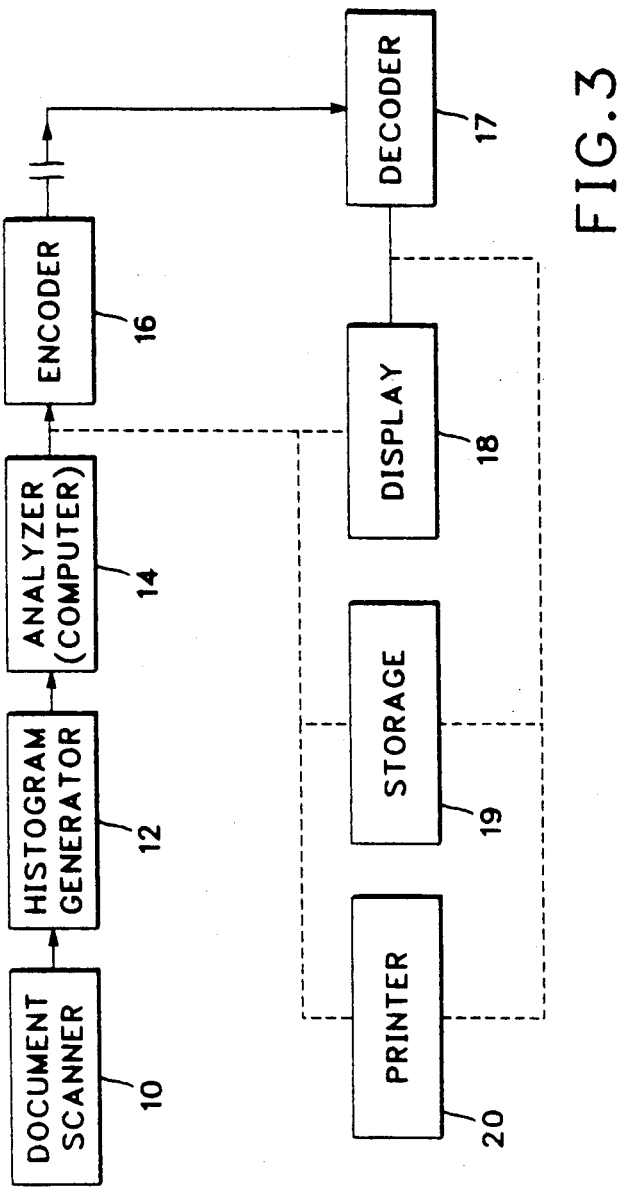
FIG. 3 is a block diagram of apparatus for carrying out the present invention.

Firstly, the median B of the distribution is calculated by summing the histogram elements until the half sum of total pixels is reached. As seen in FIG. 3, typically, the histogram will be generated by scanning the document to be transmitted with a conventional raster scanner 10 or the like which provides appropriate signals to a conventional histogram generator 12. The generated histogram is then fed to an analyzer 14 which may conveniently be a general purpose computer such as an IBM Series/I.

Next, the black extreme G and the white extreme A are calculated in the analyzer 14 by summing from each end until respective small, but significant, numbers are found, and then scanning back toward the respective intensity range ends until zero elements are found in the histogram. This prevents isolated errors from influencing the decision on the extrema locations.

The skew of the histogram is then determined from the position of the median B relative to the positions of the extrema A and G. This relationship is used to determine the color of the background. The decision is not symmetric, owing to difficulties in distinguishing an all black document from an all white document when the dynamic range is low. Therefore, unless the document background can be clearly classified as black, that is, the difference between the median and the black extreme is less than one half the difference between the median and the white extreme, the image is defined to have a white background.

The width of the background is then determined. Experiments have shown that the width of the background region can be determined from the difference between the median B and the background edge, that is, B−A in the histogram in FIG. 1. The edge between background and foreground regions is thus defined to be at C by B+½(B−A). However, not all intensities in the foreground region will be thresholded as non-background. This is simply a convenient way to establish a base for calculating the sequence of threshold levels. It should be noted that the median B is typically shifted slightly away from the peak of the distribution toward the non-background intensity region.

The threshold levels D, E, and T are now determined as fractions of the difference between point C and point G. A nonlinear scale has been found to work best, the levels preferably being set at ⅛, ¼, and ½ of the distance between point C and point G. Distances of 3/16, ⅜, and ¾ will also be found suitable so that the choice is not critical. This produces the levels D, E, and F, the threshold levels between white/gray-white, gray-white/gray-black, and gray-black/black.

The image data thus thresholded may, for example, be encoded accordingly in a suitable encoder 16, and decoded after transmission in a suitable decoder 17 for imaging on a system 18, such as a teleconferencing system. Alternatively, as shown in FIG. 3, the thresholded data may be transmitted directly to display system 18 or to a storage device 19 or printer 20, or from the decoder 17 to the latter two devices. The resulting display image in the system described, will have four intensity levels.

It will be seen that the technique of the present invention relies only on very easily obtained histogram parameters and is not significantly influenced by peculiar spikes and valleys in the histogram as a peak location technique might be. It is also computationally very simple, and when combined with shading correction techniques is very robust. Additionally, it will be found to be particularly suitable for use in a teleconferencing system for the thresholding of images to a two-bit/pixel form such as described in the previously noted U.S. Pat. Nos. 4,532,651 and 4,558,370.

Having thus described my invention, what I claim as new and desire to secure by Letters Patent is:

1. A method for thresholding image data comprising the steps of:
   generating a histogram of an image said histogram including histogram elements representative of a count of pixel elements of said image at predetermined intensities;
   computing a median of distribution of the image by summing the histogram elements until a half sum of a total of all pixels is reached;
   computing extremes of said distribution;
   determining the skew of said distribution from the relative position of said median with respect to said extremes to determine the color of the image background;
   determining a width of distribution of image background and defining an edge between background and foreground regions of the image by determining a point located between the median and the background extreme to be at a distance equal to half the distance between the median and the foreground color extreme, the edge point being used as a base for calculating a sequence of threshold levels; and
   determining said sequence of threshold levels in a foreground region of said histogram by establishing a plurality of points differentially spaced along the distance between said edge point and said foreground color extreme.

2. Method as in claim 1 wherein the step of computing the extremes of said distribution is carried out by summing the histogram elements from each end of said distribution until a small but significant number is found and then scanning back toward the respective end until respective zero elements are found in the histogram.

3. Method as in claim 1 wherein said plurality of points are spaced ⅛, ¼, and ½ of said distance.

4. Method as in claim 1 wherein said plurality of points are spaced 3/16, ⅜, and ¾ of said distance.

5. Method as in claim 1 wherein the step of determining the skew of said distribution comprises measuring the lengths of the respective distances between said median and said extremes and then determining whether the length of one distance is less than one half the length of the other distance.

6. Apparatus for thresholding image data comprising:
   means for generating a histogram of an image said histogram including histogram elements representative of a count of pixel elements of said image having predetermined intensities;
   means for computing a median of distribution of the image by summing the histogram elements until the half sum of a total of all pixels is reached;

means for computing extremes of said distribution;

means for determining the skew of said distribution from the relative position of said median with respect to said extremes to determine an color of the image background;

means for defining the edge between background and foreground regions of the image by determining a point located between the median and the background color extreme a distance equal to half the distance between the median and the foreground color extreme, the edge point being used as a base for calculating a sequence of threshold levels; and means for determining said sequence of threshold levels in a foreground region of said histogram by establishing a plurality of points differentially spaced along the distance between said edge point and said background color extreme.

7. Apparatus as in claim 6 wherein said means for computing the extremes of said distribution comprises means for summing the histogram elements from each end of said distribution until a small but significant number is found and then scanning back toward the respective end until respective zero elements are found in the histogram.

8. Apparatus as in claim 6 wherein said plurality of points are spaced ⅛, ¼, and ½ of said distance.

9. Apparatus as in claim 6 wherein said plurality of points are spaced 3/16, ⅜, and ¾ of said distance.

10. Apparatus as in claim 6 wherein said means for determining the skew of said distribution comprises means for measuring the lengths of the respective distances between said median and said extremes and means for determining whether the length of one distance is less than one half the length of the other distance.

* * * * *